US010581234B2

(12) United States Patent
Marquez et al.

(10) Patent No.: US 10,581,234 B2
(45) Date of Patent: *Mar. 3, 2020

(54) RESIDUAL CURRENT DEVICES

(71) Applicant: Shakira Limited, Ballinasloe (IE)

(72) Inventors: Alejandro Marquez, Ballinasloe (IE); Patrick Ward, Ballinasloe (IE)

(73) Assignee: Shakira Limited, Ballinasloe (IE)

( * ) Notice: Subject to any disclaimer, the term of this patent is extended or adjusted under 35 U.S.C. 154(b) by 238 days.

This patent is subject to a terminal disclaimer.

(21) Appl. No.: 15/654,806

(22) Filed: Jul. 20, 2017

(65) Prior Publication Data

US 2017/0317485 A1  Nov. 2, 2017

Related U.S. Application Data

(63) Continuation of application No. 14/819,947, filed on Aug. 6, 2015, now Pat. No. 9,800,043.

(30) Foreign Application Priority Data

Dec. 18, 2014 (GB) .................................. 1422563.5

(51) Int. Cl.
*H02H 3/08* (2006.01)
*H01H 83/04* (2006.01)
*H01H 83/14* (2006.01)
*H02H 3/33* (2006.01)

(52) U.S. Cl.
CPC .............. *H02H 3/08* (2013.01); *H01H 83/04* (2013.01); *H01H 83/144* (2013.01); *H02H 3/334* (2013.01)

(58) Field of Classification Search
CPC .......... H02H 3/08; H02H 3/334; H01H 83/04; H01H 83/144

(Continued)

(56) References Cited

U.S. PATENT DOCUMENTS 3,869,684 A   3/1975 Grobe
5,485,133 A   1/1996 Ward
(Continued)

FOREIGN PATENT DOCUMENTS

EP   1490884 B1   3/2009
GB   2203907 A   10/1988
(Continued)

OTHER PUBLICATIONS

Ward, Pat, "Demystifying RCDs ©," Western Automation: Research & Development, 2011, www.westernautomation.com, 10 pages.

(Continued)

*Primary Examiner* — Dharti H Patel
(74) *Attorney, Agent, or Firm* — Withrow & Terranova, P.L.L.C.

(57) ABSTRACT

A residual current device (RCD) comprises test circuitry which issues intermittent first test pulses each simulating a residual current fault for which a corresponding fault signal is generated. In the case of a fault in which a corresponding fault signal is not received in respect of a first pulse, the RCD attempts to force the load contacts open. The test circuitry further issues intermittent second test pulses at a frequency less than that of the first test pulses, each second test pulse simulating a residual current for which a corresponding fault signal is generated. The duration of each corresponding fault signal is greater than the response time of the load contacts to allow the load contacts to open. If the test circuitry detects that the load contacts do not open, the RCD attempts to force the load contacts open.

10 Claims, 2 Drawing Sheets

(58) Field of Classification Search
USPC .......................................................... 361/87
See application file for complete search history.

(56) References Cited

U.S. PATENT DOCUMENTS

| | | | |
|---|---|---|---|
| 5,563,756 | A | 10/1996 | Ignasiak |
| 6,975,191 | B2 | 12/2005 | Ward |
| 7,068,047 | B2 | 6/2006 | Ward |
| 7,791,848 | B2 | 9/2010 | Baldwin et al. |
| 9,800,043 | B2 * | 10/2017 | Marquez ............... H01H 83/04 |
| 2010/0295568 | A1 | 11/2010 | Ostrovsky et al. |
| 2012/0007621 | A1 | 1/2012 | Yue et al. |
| 2012/0229943 | A1 | 9/2012 | Ward |
| 2013/0241677 | A1 | 9/2013 | Padro et al. |
| 2014/0340804 | A1 | 11/2014 | Ward |
| 2016/0181783 | A1 | 6/2016 | Marquez et al. |

FOREIGN PATENT DOCUMENTS

| | | | |
|---|---|---|---|
| GB | 2231453 | A | 11/1990 |
| WO | 0074192 | A1 | 12/2000 |
| WO | 03081623 | A1 | 10/2003 |
| WO | 2007016985 | A1 | 2/2007 |
| WO | 2007144032 | A1 | 12/2007 |
| WO | 2009097469 | A1 | 8/2009 |
| WO | 2012038478 | A1 | 3/2012 |
| WO | 2012131508 | A1 | 10/2012 |

OTHER PUBLICATIONS

Non-Final Office Action for U.S. Appl. No. 14/376,167, dated May 6, 2016, 5 pages.
Internatioanl Search Report and Written Opinion for PCT/EP2013/052111 dated May 7, 2013, 12 pages.
International Preliminary Report on Patentability for PCT/EP2013/052111, dated Sep. 23, 2014, 8 pages.
Notice of Allowance for U.S. Appl. No. 14/819,947, dated Jun. 29, 2017, 10 pages.
European Search Report for European Patent Application No. 15178226.5, dated Nov. 20, 2015, 6 pages.
Combined Search and Examination Report for British Patent Application No. 1422563.5, dated Jul. 8, 2015, 5 pages.

* cited by examiner

RESIDUAL CURRENT DEVICES

This application is a continuation of U.S. application Ser. No. 14/819,947, filed Aug. 6, 2015, which claims priority to UK Application No. 1422563.5, filed Dec. 18, 2014, the disclosure of which is hereby incorporated herein by reference in its entirety.

FIELD OF THE DISCLOSURE

This invention relates to residual current devices (RCDs).

BACKGROUND

Field studies of installed RCDs (also known as GFCIs) carried out in numerous countries such as the USA, Germany, Italy and Denmark, revealed that the level of defective RCDs found in installations in those countries varied from about 3% to 8%.

Electrical installation rules in most countries require RCDs to be tested at regular intervals, e.g. every 3 or 6 months. However, some of the above studies also revealed that in most cases, RCDs are rarely tested by users.

Undetected defective RCDs deprive users of shock and fire protection, but also create a potential risk and liability for responsible bodies or persons, e.g. business owners, managers of schools, hospitals, airports, etc. in the event of a defective RCD failing to operate when required. For those organizations that do undertake regular manual testing of RCDs, there is a growing economic cost of carrying out such tests.

The most obvious reason for failure of an RCD to operate is due to component failure. However, there are other reasons that an RCD could fail to operate, e.g. desensitization due to an installation fault such as a double grounding of the neutral (DGN) condition on an AC installation, or desensitization or even blinding of an AC type RCD due to the presence of DC currents flowing in an AC "system", e.g. during electric vehicle charging.

For clarification, desensitization occurs when the trip level of an RCD increases above its rated operating level, e.g. when an RCD rated to trip at a residual current of 30 mA requires more than 30 mA to trip.

Many of the above problems are well known to those versed in the art of RCDs, which have been in use worldwide for about fifty years. However, for more detailed information on RCD technology, see the article "Demystifying RCDs" at www.westernautomation.com)

The use of RCDs with Self Test and End of Life indication has grown over recent years, and this has undoubtedly helped to improve electrical safety by exposing faulty RCDs. For convenience, the self test and end of life indication are collectively referred to as STEOL. Currently, the testing carried out under STEOL is limited to checking that the RCD can detect a residual current equivalent to a residual fault current. Generally, such ST testing does not require and even precludes the opening of the contacts. Failure of the contacts to open could be due to a variety of reasons such as welded contacts or mechanical or electrical factors associated with the opening means. However, it would be advantageous to have means to verify whether or not the contacts open under a fault condition, or whether they open under a Self Test condition where opening of the contacts is intended.

SUMMARY

According to the present invention there is provided a residual current device (RCD) comprising: first circuit means for detecting a differential current in an AC supply to a load indicative of a residual current and providing a fault signal when said residual current exceeds a given threshold, an electrical switch having load contacts in the AC supply to the load, and second circuit means responsive to said fault signal persisting beyond a certain duration to disconnect the load from the AC supply by opening the load contacts, the second circuit means issuing intermittent first test pulses, each first test pulse causing a simulated residual current exceeding said given threshold to flow, and a corresponding fault signal to be provided, for the duration of each first test pulse, the duration of each corresponding fault signal being less than said certain duration so that the load contacts do not open, the second circuit means attempting to force the load contacts to open if a corresponding fault signal is not received in respect of a first test pulse, the second circuit means further issuing intermittent second test pulses at a frequency less than that of the first test pulses, each second test pulse causing a simulated residual current exceeding said threshold to flow, and a corresponding fault signal to be provided, for the duration of each second test pulse, the duration of each corresponding fault signal being greater than said certain duration to allow the load contacts to open, the second circuit means detecting if the load contacts do not open in response to a corresponding fault signal exceeding said certain duration and attempting to force the load contacts to open in response thereto.

In a second aspect there is provided a micro control unit, MCU, for a residual current device (RCD), the MCU being operably connected to a residual current detector and an electrical switch having load contacts in an AC supply to a load, the MCU comprising: circuit means responsive to a fault signal from the residual current detector persisting beyond a certain duration to disconnect the load from the AC supply by opening the load contacts, the circuit means issuing intermittent first test pulses, each first test pulse causing a simulated residual current exceeding a given threshold to flow, and a corresponding fault signal to be provided, for the duration of each first test pulse, the duration of each corresponding fault signal being less than said certain duration so that the load contacts do not open, the circuit means attempting to force the load contacts to open if a corresponding fault signal is not received in respect of a first test pulse, the circuit means further issuing intermittent second test pulses at a frequency less than that of the first test pulses, each second test pulse causing a simulated residual current exceeding said threshold to flow, and a corresponding fault signal to be provided, for the duration of each second test pulse, the duration of each corresponding fault signal being greater than said certain duration to allow the load contacts to open, the circuit means detecting if the load contacts do not open in response to a corresponding fault signal exceeding said certain duration and attempting to force the load contacts to open in response thereto.

An embodiment described herein describes a residual current device that includes means for verifying that the contacts of the RCD have opened under a fault condition, and means for indicating failure of the contacts to open under such a condition. The device also includes self testing (ST) means, and means to indicate an "End of Life" (EOL) condition when the RCD fails to respond correctly to the ST signals, and also means to carry out an Auto-Open test on the RCD at regular intervals and Auto-Reclose in the event that the Auto-Open test is successful, and means to activate an EOL indication in the event of failure of the contacts to open during the Auto-Open test.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

The embodiment of the invention will now be described, by way of example, with reference to the accompanying drawings, in which.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
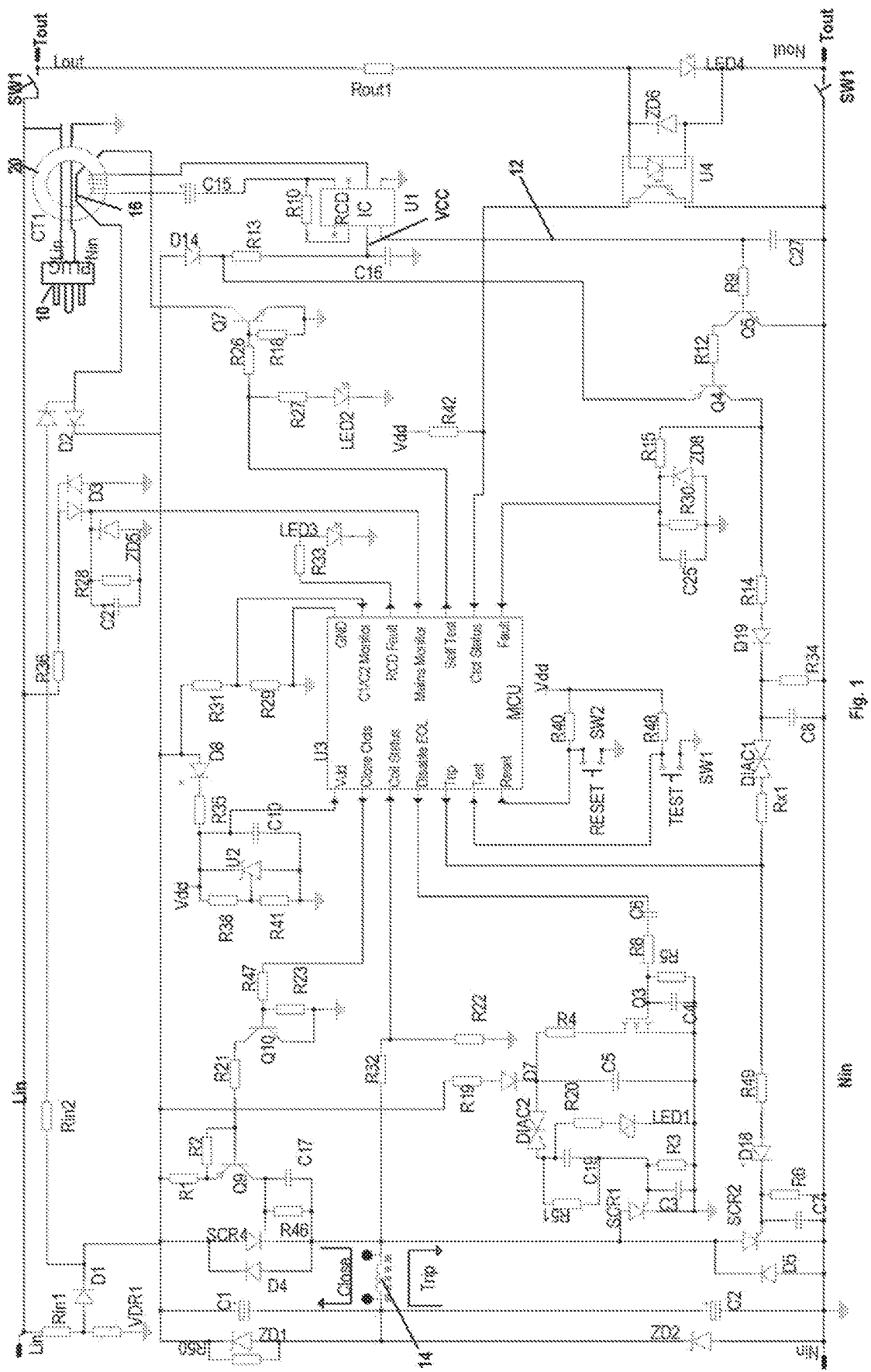
FIG. 1 is a circuit diagram of an embodiment of RCD according to the invention.

In the embodiment of FIG. 1, AC live and neutral supply conductors Lin and Nin connected to a mains supply plug 10 pass through the toroidal core 20 of a current transformer CT1 en route to a load. The load is not shown but is connected across the terminals Tout at top right and bottom right of FIG. 1 (Rout1 is not the load and is described below). Ganged load contacts SW1 in the supply conductors Lin and Nin are closed under normal conditions so that power can be provided to the load. The output of the current transformer CT1, which appears across a secondary winding W1, is fed to an RCD integrated circuit (RCD IC) U1, which may be a type WA050 supplied by Western Automation Research & Development and described in U.S. Pat. No. 7,068,047. U1 is supplied with power Vcc via resistor Rin1, diodes D1 and D14, resistor R13 and capacitor C16.

In the absence of a residual current, the vector sum of the currents flowing through the core 20 will be zero since the currents flowing in the Lin and Nin supply conductors will be equal and opposite; thus the voltage developed across W1 will be zero. The function of CT1 and U1 is to detect a differential current (i.e. a non-zero vector sum of currents) flowing through the CT core 20 having sufficient magnitude as to be indicative of a residual current above the rated operating threshold (trip level) of the RCD, e.g. 30 mA, and when such a differential current is detected to provide a high output voltage ("fault signal") on line 12 sufficient to turn on a normally-off thyristor Q5.

Also, a DC supply Vcc for a programmable microcontroller IC (MCU) is derived via D1, D8, R35 and U2. The MCU, which may include analog and/or digital circuitry, can be programmed and configured to perform a wide range of functions or features such as measurement, detection, switching, timing, pulse generation, etc. It may also include a memory function. MCUs are now widely available and well known to those versed in the art.

A DC voltage is derived via R36, D3, R28 and C21. This voltage is in fact half wave rectified AC and smoothing provided by C21 is minimal, its primary purpose being to prevent mains borne spikes from being applied to the MCU. ZD5 is an added precaution against voltage spikes. The voltage on R28 is applied to the MCU for mains supply monitoring purposes, and the MCU will therefore know when the mains supply is below an acceptable limit or above an acceptable limit.

Capacitors C1 and C2 are connected in series across Lin and Nin (which is connected to ground). Rin1 and D1 provides a path to enable C1 and C2 to charge up to respective DC voltages determined by ZD1 and ZD2 respectively. Resistors R31, R29 form a potential divider to enable the MCU to monitor the DC voltage on C1 and C2. Silicon controlled rectifiers SCR4 and SCR2 are also connected in series across Lin and Nin each in parallel with a respective one of the pair of capacitors (C1/C2), with a coil 14 connected across the junctions of C1/C2 and SCR4/SCR2 in an H-circuit.

A coil 14 is part of a bistable electromechanical switch including the load contacts SW1. When a current of sufficient magnitude flows in a first direction through the coil, right to left in FIG. 1, the load contacts Sw1 will automatically close and remain closed after the current ceases. When a current of sufficient magnitude flows though the coil 14 in the opposite direction, left to right in FIG. 1, the contacts SW1 will automatically open and remain open after current ceases. The status of the coil 14 is monitored by the MCU via R32 and R22, and if the coil 14 is open circuit (e.g. if the winding is broken) the voltage level seen by the MCU will be outside expected limits.

When the plug 10 is inserted into a mains socket and power is initially applied to the RCD circuit, C5 will start to charge up towards a DC voltage via Rin1, D1, R19 and D7. If the voltage on C5 reaches the DIAC2 breakover voltage, SCR1 will be turned on and will discharge C2 through the coil 14, thereby tripping (opening) the load contacts SW1. Also, LED1 will be lit to indicate an End Of Life (EOL) state. The EOL state may alternatively be indicated by any other suitable audible and/or visible alarm.

When the Vcc supply to the MCU and the DC charge on C1/C2 and the AC supply voltage level and the coil status are all verified by the MCU to be within acceptable limits, prior to closing the load contacts SW1, the MCU will carry out an initial self test (ST) on the RCD so as to verify that the RCD can detect a residual fault current, i.e. a residual current above the rated trip level.

The ST signal consists of a positive signal sent to Q7 via R26. LED2 will flash when such a signal is sent to Q7 to visually indicate the ST condition. When Q7 turns on it will cause a current to flow through a single winding 16 passing through the core 20 of CT1. This current will simulate a residual current caused by a current imbalance in Lin and Nin, and the circuit will be designed such that the simulated residual current will be of sufficient magnitude to exceed the rated trip level. This simulated residual current will be detected by U1 and produce a fault-indicating signal on line 12 which will be detected by the MCU at its "Fault" input via R9, Q5, Q4 and R15. (A similar arrangement is described in PCT Publication No. WO 2012131508). The MCU is continuously looking for a fault signal from Q4 and when such is detected the MCU will automatically terminate the ST signal which will allow Q7 to turn off and terminate the simulated residual current. It will be evident, therefore, that the ST signal consists of a positive pulse, initiated by the MCU upon powering up and terminated by the MCU on receipt of a fault signal from Q4.

The MCU also produces a stream of pulses to Q3 via C6 and R8 which will intermittently turn on Q3 and discharge C5 and prevent the EOL state from being indicated by LED1. However, in the event that the MCU does not receive a fault signal via Q4 or detects any other faulty condition, the EOL condition will be initiated and the closing action of the main contacts will not be performed.

On satisfactory completion of the initial ST operation and checks, the MCU sends an output signal to Q10 via R47, turning on Q10. This in turn will cause Q9 to turn on which in turn will cause SCR4 to turn on. This will discharge the charge on C1 through the coil 14 of the bistable switch. The discharging of C1 through the coil 14 will cause the load contacts SW1 to close and provide power to the load. SCR4 will turn off when C1 has discharged, allowing C1 to charge up again. The load contacts SW1 will remain closed despite the lack of current flow in the coil 14. The RCD is now in its operative state to continuously monitor the currents on Lin and Nin for residual current faults.

In its operative state the MCU sends out intermittent ST pulses at predetermined intervals (e.g. every few seconds) to periodically verify the correct operation of the RCD. The interval between the MCU initiating an ST pulse and the MCU receiving the fault signal from Q4 via R15 to terminate the ST pulse is arranged to be too short to enable the RCD to trip. As will be described in more detail below, the contacts SW1 open only when the charge on a capacitor C8 reaches the breakover level of DIAC1, and in the case of the intermittent ST pulses each pulse ends before the charge on C8 reaches that level so the DIAC1 does not conduct and the load contacts SW1 do not open. However, if the MCU does not receive a fault signal via Q4 in respect of any of the intermittent ST pulses, the EOL condition will be initiated. Thus, the MCU will stop the flow of pulses to Q3 via C4 with the result that C5 will be allowed to charge up without interruption. DIAC2 will eventually conduct and SCR1 will turn on and cause C2 to discharge through the coil to open the contacts SW1. LED1 will also light up to indicate the EOL state. Proper operation of the rest of the circuit is also verified constantly by checking Vcc supply to the MCU, DC charge on C1/C2 and the coil status.

In the operative state of the RCD, if a differential current flows in Lin and Nin with such a magnitude as to resulting in a residual current above the rated trip level of the RCD, U1 will produce an output on line 12 which will be fed to Q5 via R9. This will result in Q4 turning on and a fault signal being fed via R15 to the MCU. Q4 turning on will cause capacitor C8 to start to charge up via R14, and after a predetermined delay as set by the value of these two components, DIAC1 will conduct and provide a resultant positive signal to the gate of SCR2 causing C2 to discharge through the coil 14 and automatically open the load contacts SW1.

Each time the RCD trips under a residual fault condition, the MCU produces an output to LED3 via R33 to indicate the fault condition. In the event that the residual fault current is caused by a transient condition, Q4 will turn off before DIAC1 breakover voltage is reached, and thus a nuisance tripping condition will be avoided.

U4 is an opto coupler. When the contacts SW1 are closed and power is available at the load, as indicated by current flowing through a high value resistor Rout1 and lighting of LED4, the opto-coupler U4 is activated so that the input to the "Ctct Status" input of the MCU is low. When the contacts SW1 open, this low input is removed from the MCU. Thus U4 enables the MCU to sense the current status of the load contacts SW1.

When a residual current fault is detected by the MCU, it would expect the "Ctct Status" input to go high. However, in the event that the load contacts SW1 do not open in response to a fault signal on line 12, i.e. SCR2 does not receive an "open" signal via DIAC1, the MCU will attempt to force the contacts SW1 open. In the present context forcing the contacts SW1 to open means attempting to open the contacts by an alternative or fall-back opening procedure to that normally occurring when the RCD is operating correctly. In this case the MCU sends a trip signal to SCR2 via R49 in an attempt to force the opening of the contacts SW1. At the same time the MCU will also stop the flow of pulses to Q3 via C4 with the result that C5 will be allowed to charge up without interruption. DIAC2 will eventually conduct and SCR1 will turn on and cause C2 to discharge through the coil in a further attempt to force the contacts to open. LED1 will also light up to indicate the EOL state.

When the mains supply is removed for any reason, or a loss of supply neutral condition occurs, the loss of supply condition will be immediately detected by the MCU at its "Mains Monitor" pin via R36 and D3, and the MCU will in turn will send a trip signal to SCR2 to cause the contacts SW1 to open. Thus, the contacts are automatically opened on removal of supply and automatically closed on restoration of the supply.

The MCU includes a memory function which will recall the status of the contacts SW1 prior to a loss of supply condition. If the contacts had been in the open state, possibly due to a residual current fault or due to a user initiated opening of the contacts, the contacts will remain in the open state in the event of a subsequent loss of supply and restoration of the supply. In effect, contacts that had been in the open state due to any fault can only be reclosed by operation of a reset button RESET by the user.

An additional feature of the RCD described is that the MCU can be programmed to open the contacts and disconnect power to the load if an unsafe mains supply voltage level is detected (i.e. an under-voltage or over-voltage condition) through the Mains Monitor pin. The MCU can be programmed to keep the contacts SW1 in the open position (by choosing not to assert the "Close Ctcts" pin) due to the undervoltage or overvoltage condition, or can be programmed to automatically reclose when the supply voltage is restored within specified limits.

RCDs are provided with a test button TEST to enable the user to test the RCD. This should be done by users at regular intervals, typically every 3-6 months, to ensure that the RCD trips when tested. SW1 provides for manual testing of the RCD, and when operated by the user it causes the MCU to turn on Q7 and leave it turned on until the RCD contacts open. As described previously, the MCU will anticipate opening of the contacts in response to manual closing of SW1, and if the contacts fail to open, the EOL state will be initiated. SW2 provides for reclosing of the contacts as previously described.

It is widely accepted that users rarely test their RCDs. It would therefore be advantageous if the present RCD could perform such a function at regular intervals. In the embodiment of FIG. 1 the MCU has been programmed to initiate the sending of a positive "OPEN" ST signal to Q7 at approximately 90 day intervals (this interval can be reduced or increased as desired by the manufacturer; the ST signal is described as "OPEN" because, as contrasted with the more frequent ST signals referred to above, it is in this case intended to last long enough to allow the contacts SW1 to open. As described above, when Q7 turns on it will cause a current to flow through the winding 16 to simulate a residual current having a magnitude exceeding the rated trip level. This simulated residual current will be detected by U1 and produce a fault-indicating signal on line 12 which will be detected by the MCU at its "Fault" input. However, unlike in the case of the more frequent ST signals described earlier, this "Fault" input is ignored and the positive OPEN ST signal will continue to be sent to Q7. Eventually the contacts SW1 will open by the discharge of C2 through the coil 14 as described above. On detection of the open contact state (via U4), the MCU will terminate the OPEN ST signal and also send a signal to Q10 so as to cause the contacts SW1 to automatically reclose by discharge of C1 through the coil 14. However, if the MCU does not detect the open contact state via U4, the EOL condition will be initiated. Thus, the MCU will stop the flow of pulses to Q3 via C4 with the result that C5 will be allowed to charge up without interruption and DIAC2 will eventually conduct.

The interval between opening and reclosing the contacts SW1 may be just a few milliseconds dependent largely on the response of the bistable switch. In this case, the interruption of supply would be momentary and barely noticed by the user. However, the MCU can be programmed to keep the contacts SW1 open for a longer period if required by the user or the manufacturer, e.g. up to several hours, or even indefinitely. If left open indefinitely, the user would be required to reclose the RCD by operation of the RESET switch.

An additional feature of the RCD described herein is that the voltage fed to the MCU via D3 is not smooth DC, but rectified AC that enables the MCU to recognize the zero crossovers of the AC mains supply. This can be used to ensure that the signal to close the contacts always occurs when the AC voltage is approaching a zero-crossover, so as to minimize arcing during the closing operation. In addition, the D3 signal can be used to ensure that the contacts open at or near a zero crossover point so as to minimize arcing and stress on the contacts, etc. Such a technique is described in PCT Publication No. WO 2007/144032.

Figure 2:
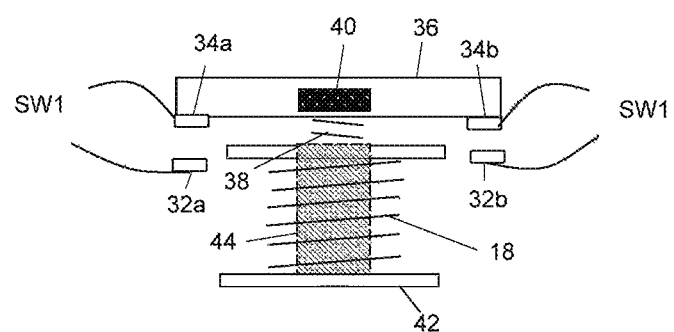
FIG. 2 is a schematic diagram of a bistable switch which may be used in the circuit of FIG. 1.

FIG. 2 shows a bistable switch which may be used in the present embodiment. It is similar to that described in our U.S. patent application Ser. No. 14/376,167.

In FIG. 2 the electromagnetic switch has a pair of fixed contacts 32a, 32b and a pair of movable contacts 34a, 34b mounted on a movable contact carrier (MCC) 36 and opposing the fixed contacts 32a, 32b respectively. An opening spring 38 biases the MCC 36 and moveable contacts 34a, 34b upwardly (as seen in FIG. 2) away from the fixed contacts 32a, 32b into a first rest position. A permanent magnet 40 is retained within the MCC 36. A fixed bobbin 42 has a solenoid coil 18 wound on it and a ferromagnetic plunger 44 extends through the bobbin.

Assuming the contacts SW1 are initially open as shown in FIG. 2, when a current of sufficient magnitude flows in a first direction through the coil 18, right to left in FIG. 1, the plunger 44 will be magnetized in such a direction that it attracts the permanent magnet 40 embedded within the MCC 36. The MCC 36 therefore moves downwardly and closes the contacts SW1. When the current is removed the force of attraction between the plunger 44 and permanent magnet 40, now in close proximity, is sufficiently great to overcome the force of the opening spring 38 so that the load contacts SW1 remain closed after the current ceases. This is the first of the two bistable states of the switch.

Now, when a current of sufficient magnitude flows though the coil 18 in the opposite direction, left to right in FIG. 1, the magnetic attraction between the plunger 44 and permanent magnet 40 is weakened so that the opening spring 38 is able to open the contacts SW1 and they will remain open after the current flow ceases. This is the second of the two bistable states of the switch.

If desired, two coaxial coils 18a, 18b (not shown) may be used with current flow in one direction through 18a closing the contacts (SW1) and current flow in the opposite direction through 18b opening the contacts.

A micro-switch (not shown) can advantageously be positioned above and close to the MCC 36 such that when the load contacts SW1 are closed the micro-switch is closed, and when the load contacts SW1 are open the micro-switch is open. This arrangement can be used to send a signal to the MCU to indicate the state of the load contacts instead of using the opto-coupler U4 previously described.

A bistable switch has been shown in the embodiment of FIG. 2 for convenience, but with suitable adaptation of the associated circuitry this could be replaced with a more conventional relay which can be electrically closed and opened. Under fault conditions, the relay will be opened by a command from the MCU, but under loss of supply conditions the relay can open automatically and not rely entirely on a signal from the MCU to open.

The embodiment of RCD described herein has a substantial range of in-built "fail safe" features. For example:
1. The contacts will only close when certain preconditions exist and the initial self test has been successfully completed.
2. The contacts will automatically open on loss of supply neutral alone or loss of supply voltage or an over-voltage condition.
3. The contacts will open automatically under a residual current fault condition, and their status will be detected and remembered by this circuit.
4. The contacts will open automatically on operation of the Test switch by the user, and their status will be detected and remembered by this circuit.
5. The contacts will open automatically under an OPEN ST test condition, and their status will be detected by this circuit. The contacts can be arranged to reclose automatically immediately the open state is detected, or after a predetermined time delay.
6. In the event that the contacts fail to open when required or expected, the EOL state will be indicated.
7. Failure of the RCD IC or its associated circuitry will be indicated by the EOL state.
8. Failure of the MCU or its associated circuitry will be indicated by the EOL state.
9. Failure of the C1 or C2 charging circuits will be indicated by the EOL state.
10. Failure of the Opto-coupler will be indicated by the EOL state.
11. Failure of the coil will be indicated by the EOL state.

Improvements and refinements can be made to the embodiment without departing materially from the essence of the invention. For example, it would be possible to program the MCU to detect a short circuited coil, but that feature has not been added to limit component count and cost. It would be possible to use a conventional electrically latching relay or contactor instead of the bistable switch, with suitable modification of the associated circuitry. One advantage of a relay is that an open coil condition would result in automatic opening of the contacts, without a need for the opening action to be initiated by the MCU.

The above described circuit provides for a portable RCD with the supply being connected via a plug. However, the invention could be equally be implemented in any RCD.

The invention is not limited to the embodiments described herein which may be modified or varied without departing from the scope of the invention. Further, those skilled in the art will recognize improvements and modifications to the preferred embodiments of the present disclosure. All such improvements and modifications are considered within the scope of the concepts disclosed herein and the claims that follow.

What is claimed is:

1. A residual current device, RCD, comprising:
   first circuit means for detecting a differential current in a supply to a load indicative of a residual current and providing a fault signal when said residual current exceeds a given threshold,
   an electrical switch having load contacts in the supply to the load, and
   second circuit means responsive to said fault signal persisting beyond a certain duration to disconnect the load from the supply by opening the load contacts,
   the second circuit means issuing intermittent first test pulses during an operative state of the RCD, each first test pulse causing a simulated residual current exceeding said given threshold to flow, and a corresponding fault signal to be provided, for the duration of each first test pulse, the duration of each corresponding fault signal being less than said certain duration so that the load contacts do not open, the second circuit means attempting to force the load contacts to open if a corresponding fault signal is not received in respect of a first test pulse,
   the second circuit means further issuing intermittent second test pulses during the operative state of the RCD at a frequency less than that of the first test pulses, each second test pulse causing a simulated residual current exceeding said threshold to flow, and a corresponding fault signal to be provided, for the duration of each second test pulse, the duration of each corresponding fault signal being greater than said certain duration to allow the load contacts to open, the second circuit means detecting if the load contacts do not open in response to a corresponding fault signal exceeding said certain duration and attempting to force the load contacts to open in response thereto.

2. The RCD as claimed in claim 1, further including a capacitor which is continuously charged by the supply, wherein the second circuit means issues third intermittent pulses which intermittently discharge said capacitor so that, responsive to said third intermittent pulses, the charge on the capacitor remains below a predetermined level, and wherein the second circuit means forces the load contacts to open by ceasing to issue the third pulses so that the charge on the capacitor eventually exceeds said predetermined level and further circuit means is responsive to the charge on the capacitor exceeding said predetermined level to open the load contacts.

3. The RCD as claimed in claim 1, wherein the electrical switch is a bistable switch having coil means wherein current flow in the coil means in a first direction causes the load contacts to close and current flow in the coil means in the opposite direction causes the load contacts to open, the load contacts remaining in their then state after current flow ceases.

4. The RCD as claimed in claim 3, comprising first and second capacitors connected in series across the supply, and first and second electronic switches also connected in series across the supply each in parallel with a respective one of said first and second capacitors, and said coil means is connected across the junctions of said first and second capacitors and said first and second electronic switches in an H-circuit, wherein closing the first electronic switch causes discharge of the first capacitor in a first direction through the coil means and closing the second electronic switch causes discharge of the second capacitor in the opposite direction through the coil means.

5. The RCD as claimed in claim 1, wherein the open or closed state of the load contacts is monitored by the second circuit means by monitoring current flow through an impedance connected across the outputs of the load contacts.

6. The RCD as claimed in claim 1, wherein each first test pulse is initiated by the second circuit means and terminated by the second circuit means on receipt of a fault signal resulting from said first test pulse.

7. The RCD as claimed in claim 1, wherein the second circuit means causes the load contacts to re-close substantially immediately the second circuit means determines that the load contacts have opened in response to a second pulse.

8. The RCD as claimed in claim 1, wherein said second circuit means comprises a micro control unit, MCU.

9. The RCD as claimed in claim 8, wherein said MCU is arranged to emit said intermittent first and second test pulses from a given port.

10. A micro control unit, MCU, for a residual current device, RCD, the MCU being operably connected to a residual current detector and an electrical switch having load contacts in a supply to a load, the MCU comprising:
    circuit means responsive to a fault signal from the residual current detector persisting beyond a certain duration to disconnect the load from the supply by opening the load contacts,
    the circuit means issuing intermittent first test pulses during an operative state of the RCD, each first test pulse causing a simulated residual current exceeding a given threshold to flow, and a corresponding fault signal to be provided, for the duration of each first test pulse, the duration of each corresponding fault signal being less than said certain duration so that the load contacts do not open, the circuit means attempting to force the load contacts to open if a corresponding fault signal is not received in respect of a first test pulse,
    the circuit means further issuing intermittent second test pulses during the operative state of the RCD at a frequency less than that of the first test pulses, each second test pulse causing a simulated residual current exceeding said threshold to flow, and a corresponding fault signal to be provided, for the duration of each second test pulse, the duration of each corresponding fault signal being greater than said certain duration to allow the load contacts to open, the circuit means detecting if the load contacts do not open in response to a corresponding fault signal exceeding said certain duration and attempting to force the load contacts to open in response thereto.

* * * * *